Sept. 6, 1932.  L. L. NETTLETON  1,875,883
SIGNALING APPARATUS
Filed April 30, 1928
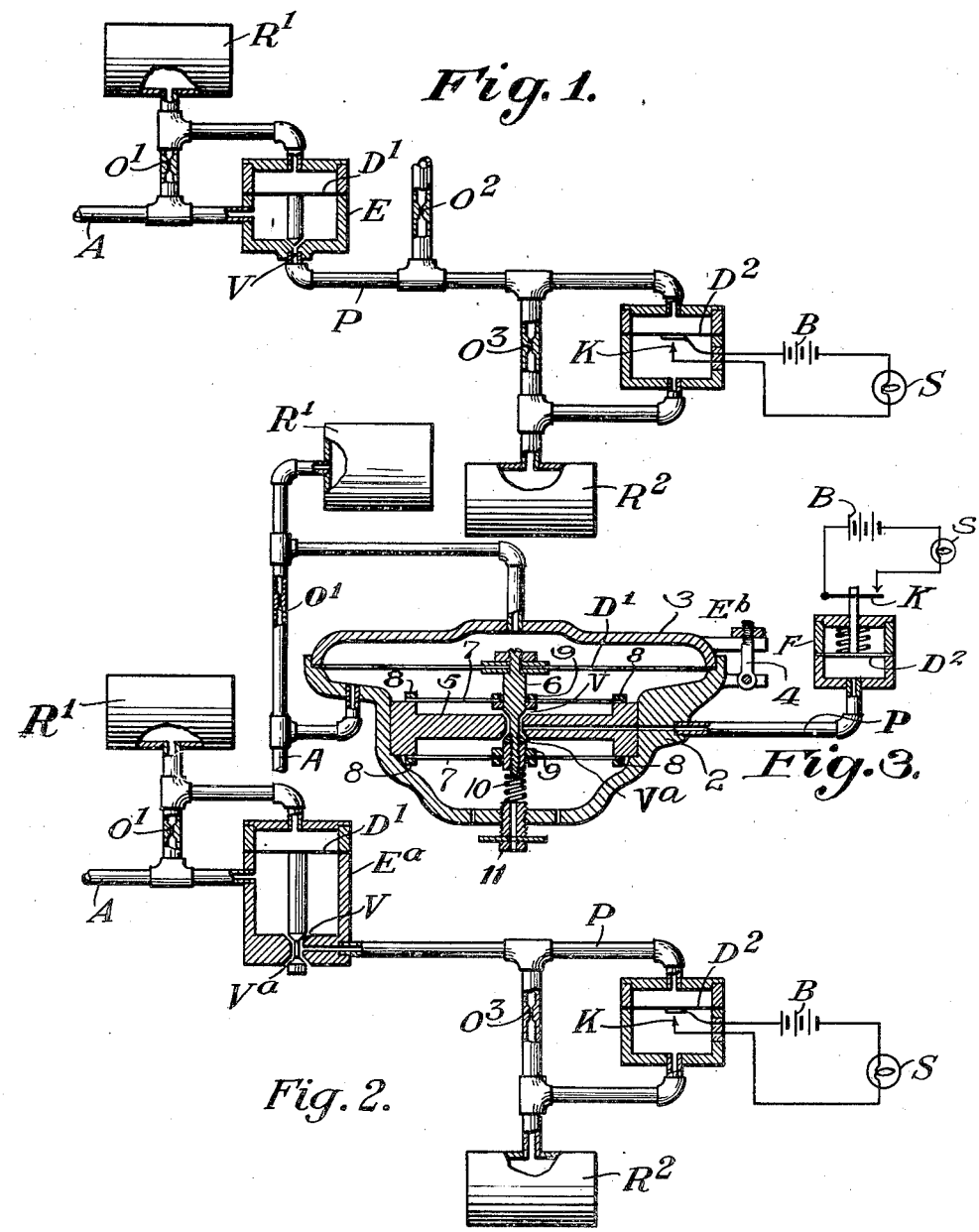

Patented Sept. 6, 1932

1,875,883

UNITED STATES PATENT OFFICE

LEWIS L. NETTLETON, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

SIGNALING APPARATUS

Application filed April 30, 1928. Serial No. 273,883.

My invention relates to signaling apparatus, and particularly to apparatus for signaling between two points on a railway train, such, for example, as between the locomotive and the caboose of a freight train. More particularly, my present invention relates to apparatus of the type in which the signals are transmitted through the medium of the usual train brake pipe containing fluid under pressure.

I will describe two forms of apparatus embodying my invention, and will then point out the novel features thereof in claims.

In the accompanying drawing, Fig. 1 is a view, partly diagrammatic, showing one form of apparatus embodying my invention. Fig. 2 is a view showing a modification of a portion of the apparatus shown in Fig. 1 and also embodying my invention. Fig. 3 is a view showing another form of apparatus also embodying my invention.

Similar reference characters refer to similar parts in each of the views.

Referring first to Fig. 1, the reference character A designates the usual train brake pipe, which is normally supplied with air under pressure, and which controls the brake applying apparatus in the ordinary and well known manner. A reservoir $R^1$ is connected with brake pipe A through a restricted orifice $O^1$, and a diaphragm $D^1$ of a pressure change amplifier E has its two sides exposed to the pressures on the two sides respectively of the orifice $O^1$. That is to say, the lower surface of diaphragm $D^1$ is exposed to the pressure in the brake pipe A, whereas, the upper surface of this diaphragm is exposed to the pressure in reservoir $R^1$. Diaphragm $D^1$ controls a valve V which is interposed between the brake pipe A and an auxiliary pipe P. The auxiliary pipe P is connected with atmosphere through a restricted orifice $O^2$, and with a second reservoir $R^2$ through a restricted orifice $O^3$. A second diaphragm $D^2$ has its upper side exposed to the pressure in pipe P and its lower side exposed to the pressure in reservoir $R^2$; in other words, the two sides of diaphragm $D^2$ are exposed to the pressures on the two sides respectively of the orifice $O^3$. Diaphragm $D^2$ actuates a contact K which controls a signaling device S of any suitable type, such, for example, as an electric bell or a lamp, this signaling device being supplied with current from a battery B.

The brake pipe A is provided with signal transmitting means which forms no part of my present invention, but which is adapted to impress pulsations on the air in the brake pipe. These impulses may be either increases of brake pipe pressure or decreases of brake pipe pressure, and they may, for example, be impressed by apparatus similar to the transmitting apparatus disclosed in my co-pending application for Letters Patent of the United States, Serial No. 238,567, filed December 8, 1927.

The operation of the apparatus shown in Fig. 1, is as follows: Assuming that the pressure in brake pipe A has been constant for a length of time such that the pressures in all parts of the apparatus have reached an equilibrium, then the pressure in reservoir $R^1$ will be the same as the pressure in brake pipe A, and there will consequently be no pressure difference across orifice $O^1$. Diaphragm $D^1$ will then occupy its normal position, wherein valve V is open by a very slight amount. Consequently, a small stream of air will flow through the brake pipe A through valve V, and out to atmosphere through orifice $O^2$, so that the pressure in pipe P will be considerably lower than the pressure in the brake pipe A. The pressure in pipe P will, of course, be determined by the relation between the size of orifice $O^2$ and the opening of valve V. The pressure in reservoir $R^2$ will be the same as the pressure in pipe P, so that there is no pressure difference across orifice $O^3$. Diaphragm $D^2$, therefore, occupies its normal position, wherein contact K is open and the signaling device S is de-energized. I will now assume that there is a small increase in the pressure in brake pipe A. This will cause a higher pressure on the lower side of diaphragm $D^1$ than on the upper side of this diaphragm, so that the diaphragm $D^1$ will bulge upwardly, thereby increasing the opening of valve V. This will result in an increase in the pressure in pipe P, which pressure increase is much greater than the pressure increase in the brake pipe A, because a small movement of the diaphragm $D^1$ changes the relative openings of valve V and orifice $O^2$ by a comparatively large amount. It follows that the pressure increase in the brake pipe is amplified to a much larger increase of pressure in the pipe P. This increase of pressure in pipe P will cause a pressure difference across orifice $O^3$, so that the pressure on the upper side of diaphragm $D^2$ will be considerably greater than the pressure on the lower side of this diaphragm. Consequently, diaphragm $D^2$ will bulge downwardly to close contact K, and so to energize the signaling device S. It follows that a small change in the brake pipe pressure is amplified to a much larger change of pressure on the two sides of diaphragm $D^2$, so that a change of pressure in the brake pipe which would be too small to operate a rugged and reliable contact can be amplified sufficiently to operate such a contact in a satisfactory manner.

Preferably a selecting means will be interposed between contact K and the signaling device S, whereby this signaling device will be operated only in response to definitely timed pressure impulses in the brake pipe. One form of selecting apparatus which is suitable for this purpose, is described and claimed in my co-pending application for Letters Patent of the United States, Serial No. 238567, filed December 8, 1927.

The apparatus shown in Fig. 2 is the same as that shown in Fig. 1, except that the orifice $O^2$ between the auxiliary pipe P and the atmosphere is replaced by a valve $V^a$ incorporated in the pressure change amplifier which is here designated $E^a$. That is to say, the diaphragm $D^1$ operates a valve V between the brake pipe A and the auxiliary pipe P, and it also operates a second valve $V^a$ between the auxiliary pipe P and the atmosphere. Normally both of these valves are open, but when the diaphragm moves upwardly in response to an increase in brake pipe pressure, the opening of valve V is increased and the opening of valve $V^a$ is decreased, so that the pressure in pipe P increases. By this means the effect of a given movement of diaphragm $D^1$ is double the effect of the same movement of the diaphragm with the apparatus shown in Fig. 1, and, consequently, the arrangement of apparatus shown in Fig. 2 greatly increases the amplification of pressure change which may be obtained from a single diaphragm.

Referring now to Fig. 3, the brake pipe A, the restricted orifice $O^1$, and the reservoir $R^1$, are the same as the corresponding parts in Figs. 1 and 2, but the pressure change amplifier, which is here designated $E^b$, is constructed in such manner that the valve stem which operates the valves V and $V^a$ is free to move without friction. As here shown, this amplifier comprises a body member 2 and a cover 3, which are clamped together by bolts 4 with the diaphragm $D^1$ interposed between the body member and the cover. Mounted within the body member 2 is a casting 5, which forms the seats for the valves V and $V^a$, and which also serves as a support for the valve stem 6. The valve stem 6 is supported by a plurality of flexible metallic strips 7, one end of each strip being attached to the valve stem 6 by a clamp 9, and the other end of each strip being attached to the casting 5 by a clamp 8. Preferably one set of strips 7 is located on the upper side of the casting 5 and another set of strips 7 is located on the lower side of the casting 5, the upper and lower faces of this casting being recessed to accommodate the strips and the clamps 9. The flexible strips 7 are drawn up to the desired tension with the valve stem 6 centered with respect to the valve seats, and the strips are then attached to the casting 5 by the clamps 8. With this construction the valve stem 6 is free to move vertically without friction, and it encounters no frictional forces until either valve V or $V^a$ is completely closed. A spring 10 supports the valve stem 6 against the air pressure above it, and this spring is adjusted by a screw 11 until the desired pressure is obtained in the auxiliary pipe P. The operation of the pressure change amplifier $E^b$ is the same as that of the amplifier $E^a$ shown in Fig. 2, and need not be repeated here. A pneumatic relay F is connected with the auxiliary pipe P, this relay comprising a diaphragm $D^2$ controlling a contact K. Contact K controls a signaling device S in the same manner as in the preceding views. I have found that the amplifier $E^b$, shown in Fig. 3, creates a sufficient change of pressure in pipe P in response to reasonable changes of pressure in the brake pipe A to enable me to utilize a standard pneumatic relay F for the control of the signaling device S.

Although I have herein shown and described only three forms of apparatus embodying my invention, it is understood that various changes and modifications may be made therein within the scope of the appended claims without departing from the spirit and scope of my invention.

Having thus described my invention, what I claim is:

1. A receiver for train brake pipe signaling, comprising a reservoir connected with the brake pipe through a restricted orifice, a pressure change amplifier containing a diaphragm and connected on opposite sides of said diaphragm with said brake pipe and said reservoir respectively, an auxiliary pipe connected with atmosphere through a restricted orifice, and a valve interposed between said auxiliary pipe and the brake pipe and controlled by said diaphragm and arranged to be open a slight amount when the pressures on opposite sides of said first orifice are equal, said parts also being so arranged that the amount of opening of said valve increases or decreases in response to an increase or decrease of pressure in the brake pipe, whereby a relatively small change in brake pipe pressure results in a relatively large change of pressure in said auxiliary pipe.

2. A receiver for train brake pipe signaling, comprising a reservoir connected with the brake pipe through a restricted orifice, a pressure change amplifier containing a diaphragm and connected on opposite sides of said diaphragm with said brake pipe and said reservoir respectively, an auxiliary pipe, two valves controlled by said diaphragm one of which connects said auxiliary pipe with the brake pipe and the second of which connects said auxiliary pipe with atmosphere, said parts being so arranged that both valves are open when the pressures on opposite sides of said orifice are equal, and that an increase of brake pipe pressure increases the opening of the first valve and decreases the opening of the second valve, and vice-versa, whereby a relatively small change in brake pipe pressure results in a relatively large change of prssure in said auxiliary pipe.

3. A receiver for train brake pipe signaling, comprising a pressure change amplifier containing a diaphragm, means for connecting said amplifier on one side of said diaphragm directly with the brake pipe and on the other side of the diaphragm with the brake pipe through a restricted orifice, an auxiliary pipe connected with atmosphere through a restricted orifice, and a valve interposed between said auxiliary pipe and the brake pipe and controlled by said diaphragm and arranged to be open a slight amount when the pressures on opposite sides of said first orifice are equal, said parts also being so arranged that the amount of opening of said valve increases or decreases in response to an increase or decrease of pressure in the brake pipe, whereby a relatively small change in brake pipe pressure results in a relatively large change of pressure in said auxiliary pipe.

4. A receiver for train brake pipe signaling, comprising a pressure change amplifier containing a diaphragm, means for connecting said amplifier on one side of said diaphragm directly with the brake pipe and on the other side of the diaphragm with the brake pipe through a restricted orifice, an auxiliary pipe, two valves controlled by said diaphragm one of which connects said auxiliary pipe with the brake pipe and the second of which connects said auxiliary pipe with atmosphere, said parts being so arranged that both valves are open when the pressures on opposite sides of said orifice are equal, and that an increase of brake pipe pressure increases the opening of the first valve and decreases the opening of the second valve, and vice-versa, whereby a relatively small change in brake pipe pressure results in a relatively large change of pressure in said auxiliary pipe.

In testimony whereof I affix my signature.
LEWIS L. NETTLETON.